(12) United States Patent
Lee (10) Patent No.: US 9,343,036 B2
(45) Date of Patent: May 17, 2016

(54) ELECTRONIC APPARATUS AND OPERATION METHOD THEREOF

(71) Applicant: HTC Corporation, Taoyuan County (TW)

(72) Inventor: Yu-Cheng Lee, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 5 days.

(21) Appl. No.: 13/711,634

(22) Filed: Dec. 12, 2012

(65) Prior Publication Data

US 2013/0150019 A1  Jun. 13, 2013

Related U.S. Application Data

(60) Provisional application No. 61/569,725, filed on Dec. 12, 2011.

(51) Int. Cl.
| | |
|---|---|
| *H04M 1/66* | (2006.01) |
| *G09G 5/00* | (2006.01) |
| *G06F 3/041* | (2006.01) |
| *H04L 12/58* | (2006.01) |
| *G06F 9/44* | (2006.01) |
| *G06Q 10/10* | (2012.01) |

(52) U.S. Cl.
CPC ............... *G09G 5/003* (2013.01); *G06F 3/041* (2013.01); *G06F 9/4443* (2013.01); *G06Q 10/107* (2013.01); *G09G 2358/00* (2013.01); *H04L 51/24* (2013.01)

(58) Field of Classification Search
CPC ...... H04W 12/06; H04W 12/08; H04W 12/00
USPC ................................. 455/410, 411
See application file for complete search history.

(56) References Cited

U.S. PATENT DOCUMENTS

| | | | | |
|---|---|---|---|---|
| 2008/0310602 | A1* | 12/2008 | Bhupati | 379/88.12 |
| 2010/0306705 | A1* | 12/2010 | Nilsson | 715/835 |
| 2011/0130170 | A1 | 6/2011 | Han et al. | |
| 2011/0294467 | A1* | 12/2011 | Kim et al. | 455/411 |
| 2011/0319056 | A1* | 12/2011 | Toy et al. | 455/412.2 |
| 2012/0185933 | A1* | 7/2012 | Belk et al. | 726/17 |
| 2012/0284297 | A1* | 11/2012 | Aguera-Arcas et al. | 707/769 |
| 2013/0102281 | A1* | 4/2013 | Kanda et al. | 455/410 |

FOREIGN PATENT DOCUMENTS

| | | |
|---|---|---|
| CN | 102075618 | 5/2011 |
| TW | 200421183 | 10/2004 |
| TW | I252661 | 4/2006 |
| WO | 2011146740 | 11/2011 |

OTHER PUBLICATIONS

"Office Action of Taiwan Counterpart Application", issued on Jan. 27, 2015, p. 1-p. 6, in which the listed references were cited.
"Office Action of China Counterpart Application," issued on Apr. 20, 2015, p. 1-p. 8, in which the listed references were cited.

\* cited by examiner

*Primary Examiner* — Omoniyi Obayanju
(74) *Attorney, Agent, or Firm* — Jianq Chyun IP Office (57) ABSTRACT

An electronic apparatus and an operation method thereof are provided. In case that a display unit enters a screen lock mode, a message input interface is displayed on the display unit when it is detected that a message option is enabled, and a note message is generated by the message inputting interface. A lock screen is returned and a prompt item corresponding to the note message is displayed on the lock screen when the message input interface is finished.

13 Claims, 5 Drawing Sheets

ELECTRONIC APPARATUS AND OPERATION METHOD THEREOF

CROSS-REFERENCE TO RELATED APPLICATION

This application claims the priority benefits of U.S. provisional application Ser. No. 61/569,725, filed on Dec. 12, 2011. The entirety of the above-mentioned patent applications is hereby incorporated by reference herein and made a part of this specification.

BACKGROUND

1. Technical Field

The invention relates to an operation method of an electronic apparatus. Particularly, the invention relates to an electronic apparatus having a message function and an operation method thereof.

2. Related Art

Human-computer environment has been developed for over a half century from the past large-scale mainframes to personal computers, and computer systems capable of providing high-speed computation and having a large amount of storage capability are quickly developed together with a huge network and become indispensable tools in people's daily life. Along with progress of technology, popularity of the computer system has increased year by year. The modern people are more and more accustomed to use the computer systems as tools in daily office work, study, communication, information browsing and entertainment. Therefore, to ensure the computer system to have diversified function to assist people's daily life is one of subjects to be studied.

SUMMARY

The invention is directed to an electronic apparatus and an operation method thereof, by which a message provider is capable of inputting message under a screen lock mode.

The invention provides an operation method of an electronic apparatus, the electronic apparatus includes a display unit and a processing unit, and the processing unit is coupled to the display unit. In such method, when the electronic apparatus enters a screen lock mode, the display unit displays a lock screen, and the lock screen includes a message option. Moreover, the processing unit detects that the message option is enabled. A message input interface is displayed by the display unit. After all, a note message is generated through the message input interface, and a prompt item corresponding to the note message is displayed on the lock screen through the display unit.

The invention provides an electronic apparatus including a display unit and a processing unit. The processing unit is coupled to the display unit, and the display unit displays a lock screen in case of a screen lock mode, and displays a message option on the lock screen. When the processing unit detects that the message option is enabled, the processing unit controls will display a message input interface on the display unit, so as to generate a note message through the message input interface. Moreover, the display unit can further display a prompt item corresponding to the note message on the lock screen.

According to the above descriptions, in case of the screen lock mode, the message function can be executed, and the message is prompted on the lock screen, and when the user returns back to the seat and see the message from a visitor on the lock screen, the user learns that the visitor visits during a period when the user is away from the electronic apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Generally, after a user leaves his seat, if a visitor visits, the visitor can only leave a message to the user by using a pen and a paper. Therefore, if the pen and the paper are not available, the visitor cannot leave any message. Moreover, the conventional pen and paper message may have problems of illegible handwriting or missing the paper written with the message due to external factors, etc. Therefore, the invention provides an electronic apparatus and an operation method thereof, by which the electronic apparatus can be used to leave a message, so as to improve usage convenience of the electronic apparatus. In order to fully convey the spirit of the invention, embodiments are provided below for detailed descriptions.

Figure 1A:
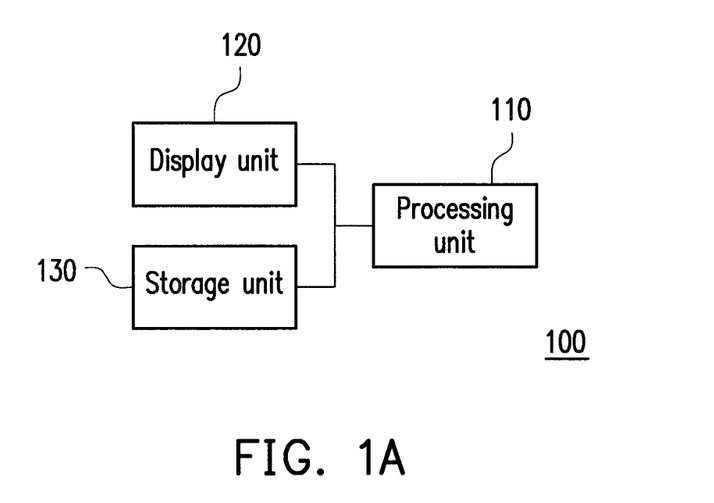
FIG. 1A and FIG. 1B are block diagrams of an electronic apparatus according to an embodiment of the invention.
Figure 1B:
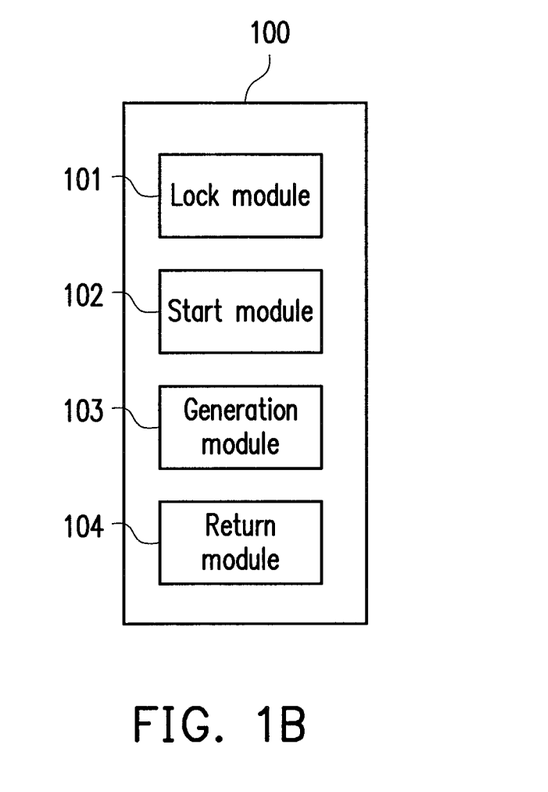

FIG. 1A and FIG. 1B are block diagrams of an electronic apparatus according to an embodiment of the invention. Referring to FIG. 1A, the electronic apparatus 100 includes a processing unit 110, a display unit 120 and a storage unit 130. The electronic apparatus 100 is, for example, a device having a computation function, such as a desktop computer, a notebook computer, a tablet personal computer (PC), and a smart phone, etc.

The processing unit 110 is, for example, a central processing unit (CPU) or a microprocessor, etc., which is used to execute hardware, firmware and process data in software of the electronic apparatus 100. The processing unit 110 is coupled to the display unit 120 and the storage unit 130.

The display unit 120 is, for example, a cathode ray tube (CRT) display, a liquid crystal display (LCD), a plasma display, or a touch display, etc. The touch display is, for example, a capacitive screen, a resistive screen, or an acoustic wave screen, etc. that has a touch control function, or has a touch control function after combining with other devices.

The storage unit 130 is, for example, a non-volatile memory (NVM), a dynamic random access memory (DRAM) or a static random access memory (SRAM), etc.

In case that program codes are used to implement an operation method of the electronic apparatus 100, the storage unit 130 stores a plurality of program instructions, and after the program instructions are installed, the program instructions are executed by the processing unit 110. The program instructions include a plurality of commands and the processing unit 110 executes these commands to implement various steps of the operation method. In the present embodiment, the electronic apparatus 100 only includes one processing unit 110, and in other embodiments, the electronic apparatus 100 may include a plurality of processing units, and the installed program fragments are executed by the processing units.

In detail, in case that the display unit 120 enters the screen lock mode, a message option is displayed in a lock screen of the display unit 120. When the processing unit 110 detects that the message option is enabled, a message input interface is displayed on the display unit 120, so as to generate a note message through the message input interface, when the message input interface is ended, it is returned to the lock screen, and a prompt item corresponding to the note message is displayed on the lock screen. It should be noticed that the note message can be one of a text, a sound, a voice or an image file or a combination thereof, though the invention is not limited thereto. For simplicity's sake, the note message of a text is taken as an example for descriptions.

Moreover, the above steps are executed by corresponding program modules, as that shown in FIG. 1B. Referring to FIG. 1B, the electronic apparatus 100 further includes a lock module 101, a start module 102, a generation module 103 and a return module 104. The above modules are driven and executed by the processing unit 110, and each of the above modules is composed of program fragments written in a program language, and is stored in the storage unit 130. The lock module 101 makes the display unit 120 to enter the screen lock mode. When it is detected that the message option is enabled, the start module 302 displays the message input interface in the display unit 120. The generation module 103 generates the note message according to a text input received thought the message input interface. The return module 104 is returns to the lock screen when the message input interface is ended, and displays the prompt item corresponding to the note message on the lock screen.

Moreover, in other embodiments, each of the above modules can be implemented by a physical circuit composed of one or a plurality of logic gates.

Figure 2:
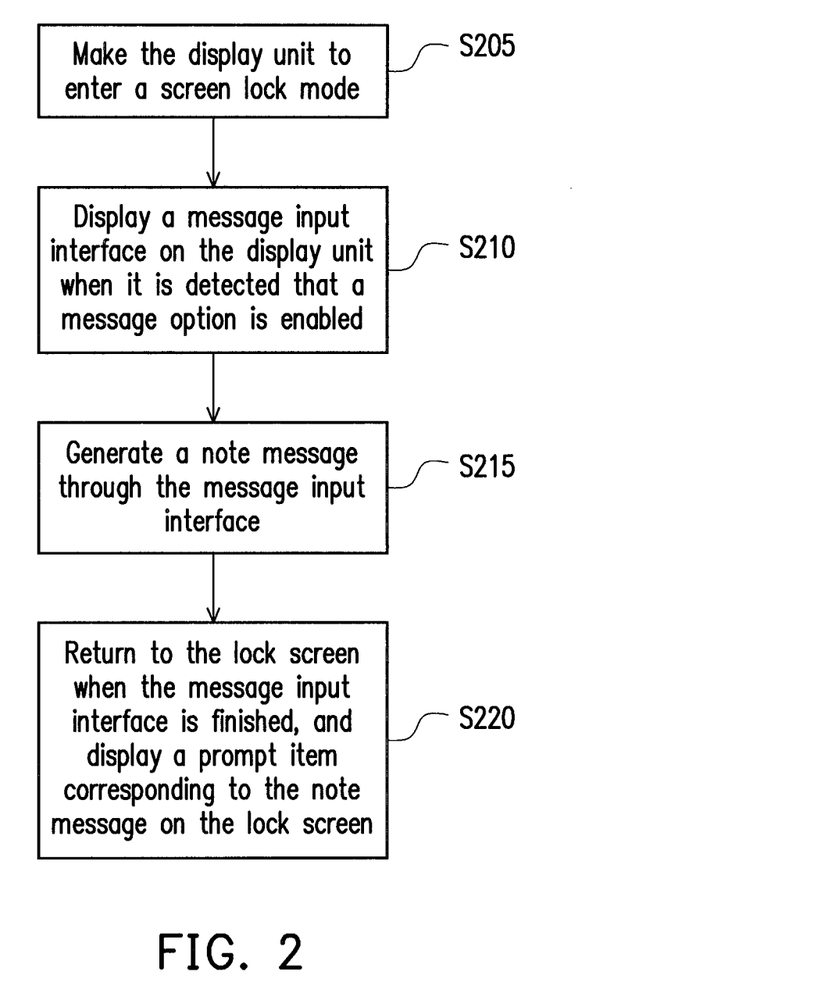
FIG. 2 is a flowchart illustrating an operation method according to an embodiment of the invention.

An operation method of the electronic apparatus 100 having the message function is described in detail below. FIG. 2 is a flowchart illustrating an operation method according to an embodiment of the invention. Referring to FIG. 1A and FIG. 2, in the step S205, the display unit 120 enters the screen lock mode. Here, under the screen lock mode, the lock screen displayed on the display unit 120 includes a message option.

For example, after the electronic apparatus 100 idles for a predetermined period of time, the processing unit 110 makes the display unit 120 to enter the screen lock mode. Alternatively, a physical or a virtual function key or hot key can be set on the electronic apparatus 100, and when the set function key or hot key is enabled, the processing unit 110 is driven to make the display unit 120 to enter the screen lock mode.

Under the screen lock mode, in step S210, when the processing unit 110 detects that the message option is enabled, the message input interface is displayed on the display unit 120. Here, the message option is, for example, a shortcut corresponding to the message input interface. When the processing unit 110 receives an enable signal corresponding to the message option, for example, the message option is selected, the processing unit 110 activates the message input interface on the display unit 120. For example, another frame is displayed on the lock screen to display the message input interface. The message input interface can totally overlap the lock screen, and can only overlap a part of the lock screen. Namely, a display size of the message input interface can be equal to or smaller than a size of the lock screen.

In step S215, the processing unit 110 generates the note message through the message input interface. For example, an input unit (for example, physical keys such as a keyboard, etc. or a handwriting board) of the electronic apparatus 100 is used to receive a text input, and the processing unit 110 displays corresponding content in the message input interface according to the text input, so as to generate a note message. Alternatively, the display unit 120 can be a touch display unit, and an input block can be divided in the touch display unit to facilitate a message provider performing handwriting or touch input. Namely, the message input interface includes a message block and an input block, where the text input is received through the input block, and the corresponding content is displayed in the message block according to the text input, so as to generate the note message.

It should be noticed that if the message content is a sound, a voice or an image, the input unit of the electronic apparatus 100 may further include a microphone or a video camera, and the processing unit 110 generates the note message according to one of a text, a sound, an image file or a combination thereof, though the invention is not limited thereto.

In step S220, when the message input interface is ended, the processing unit 110 controls the display unit 120 to return to the lock screen and display a prompt item corresponding to the note message on the lock screen. Namely, the generated note message is displayed on the lock screen in a way of the prompt item.

Moreover, after the note item is generated, a password setting interface can be displayed on the display unit 120, so as to set a specific name and a specific password for the note message through the password setting interface. Moreover, if a program of setting the specific name and the specific password is executed after the note message is generated, in case of the lock screen, when the prompt item of the note message is enabled, a decoding interface is displayed on the display unit 120 to receive an input name and an input password.

When the input name and the input password are respectively complied with the previously set specific name and the specific password, the note message is displayed on the message input interface, and a message provider of the note message can again edit the note message according to an actual requirement. In other words, the message provider can only edit and modify his own note message by inputting a name and a password complied with the specific name and the specific password. In this way, a situation that different message providers tamper note messages of the others is avoided. Here, regarding a method of enabling the prompt item of the note message, the prompt item can be directly selected, or the prompt item can be dragged to a specific block in the lock screen.

Moreover, the electronic device 100 may further receive a screen unlock instruction, and unlocks the screen lock mode through a screen unlocking procedure. Moreover, after the screen lock mode is ended, a message box interface is displayed on the display unit 120. The message box interface includes the note message generated through the aforementioned steps S205-S220. Namely, the user of the electronic apparatus 100 can directly open the message box interface to browse all of the note messages generated during the previous screen lock mode after unlocking the screen lock mode, and can further store, copy, transfer, share or delete the note messages according to an actual requirement.

FIG. 3A-FIG. 3D are schematic diagrams of interface operation according to an embodiment of the invention. In the present embodiment, the display unit 120 is, for example, a touch display unit, and in other embodiments, the display unit 120 can also be used in collaboration with an input unit such as a keyboard or a handwriting board, etc to implement the aforementioned operation method.

Figure 3A:
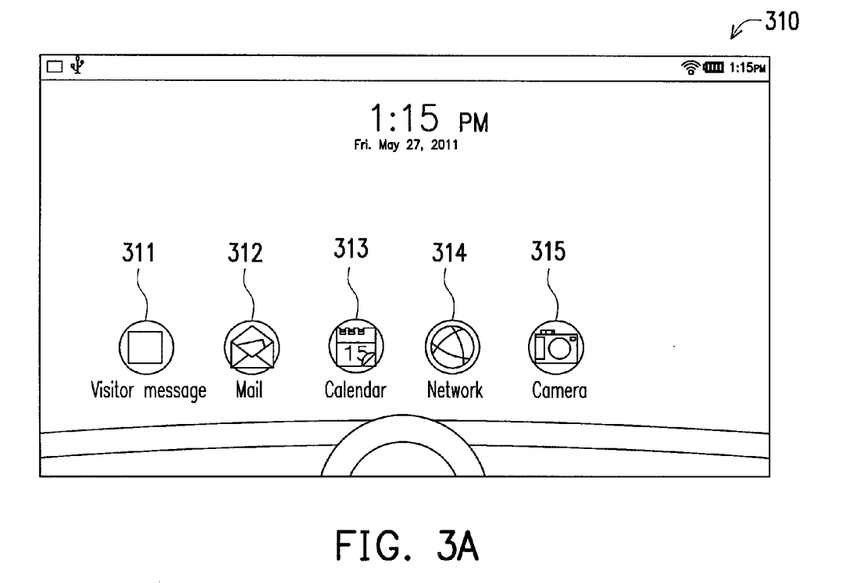
FIG. 3A-FIG. 3D are schematic diagrams of interface operation according to an embodiment of the invention.

FIG. 3A illustrates a lock screen 310 of the display unit 120 in the screen lock mode. The lock screen 310 includes a message option 311, and the lock screen 310 may also include a plurality of shortcut options 312-315. In the present embodiment, the message option 311 provides a message function to a visitor, and after the message option 311 is enabled, a function corresponding to the message option 311 can be executed under the screen lock mode, i.e. a message input interface is activated and displayed on the display unit 120. Moreover, based on security consideration, when one of the other shortcut options 312-315 is enabled, a screen unlock procedure is, for example, first performed, and a function corresponding to the enabled one of the shortcut options 312-315 can be executed after the screen lock mode is ended. However, in other embodiments, the lock screen 310 may only display the message option 311.

Figure 3B:
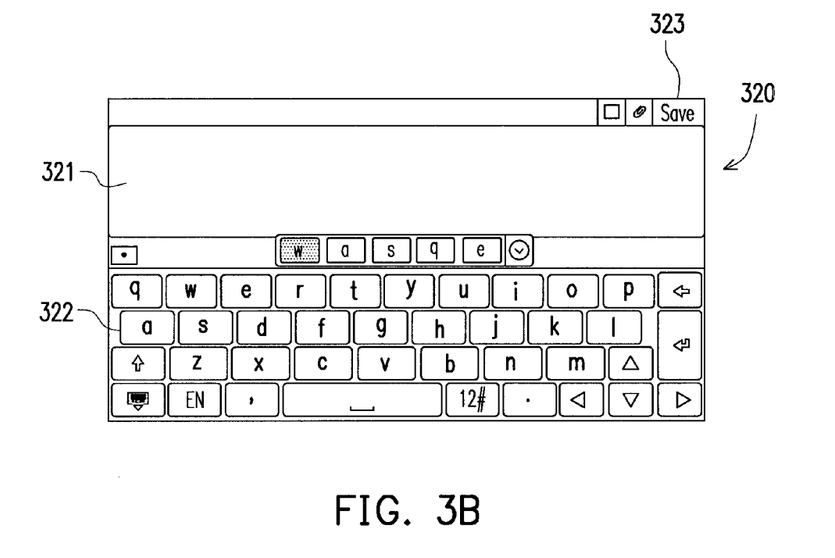

When the message option 311 is enabled, as that shown in FIG. 3B, a message input interface 320 is displayed on the display unit 120. In the present embodiment, the display unit 120 is, for example, a touch display unit. Therefore, the message input interface 320 includes a message block 321 and an input block 322. A text input is received through the input block 322, and corresponding content is displayed in the message block 321 according to the text input, so as to generate the note message. For example, when the message provider completes the text input, the message provide can press a save key 323 to generate the note message.

Moreover, the message input interface 320 may further include a field for inputting a name of the message provider, so that the user of the electronic apparatus 100 views the message, the user can clearly know the visitor that leaves the note message.

Figure 3C:
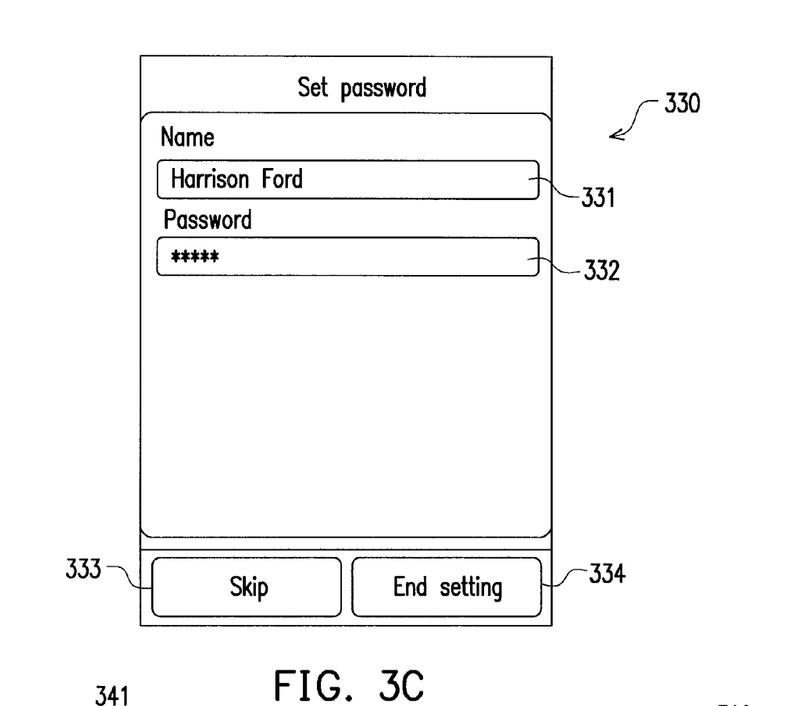

After the note message is generated, a set of specific name and specific password can be further set, so as to avoid arbitrary tampering of the note message. FIG. 3C illustrates a password setting interface 330, and the specific name and the specific password of the note message can be set through the password setting interface 330. The password setting interface 330 includes a field 331 and a filed 332, and the message provider can respectively set the specific name and the specific password in the field 331 and the field 332. After an end setting key 334 is pressed, the message input interface 320 is ended to complete leaving the message.

Alternatively, if the message provider does not want to set the specific name and the specific password, the message provider can press a skip key 333 to skip the password setting procedure, and then the message input interface 320 is ended to complete leaving the message.

Figure 3D:
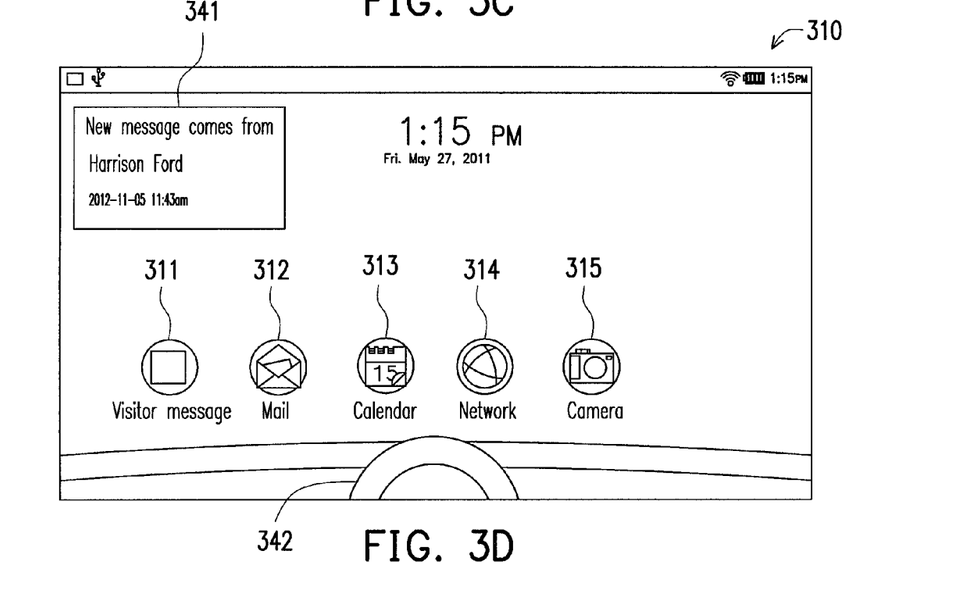

When the message input interface 320 is ended, the processing unit 110 controls the display unit 120 to return to the lock screen 310, as shown in FIG. 3D, and displays a prompt item 341 corresponding to the note message on the lock screen 310. Here, the prompt item 341 includes a name of the message provider and a timestamp of the message. In the present embodiment, the content of the note message is not directly displayed in the lock screen 310, and only the name of the message provider and the timestamp of the message are displayed. However, in other embodiments, the content of the note message can be directly displayed in the lock screen 310 according to an actual usage requirement, which is not limited by the invention.

Moreover, in the lock screen 310 of FIG. 3D, when the prompt item 341 of the note message is enabled, if setting of specific name and specific password has been performed in advance in allusion to the note message corresponding to the prompt item 341, the processing unit 110 controls the display unit 120 to display a decoding interface to receive an input name and an input password. When the input name and the input password are respectively complied with the specific name and the specific password set in advance, the note message is displayed on the message input interface 320, and the message provider of the note message can again edit the note message according to an actual requirement. In other words, the message provider can only edit and modify his own note message by inputting a name and a password complied with the specific name and the specific password.

On the other hand, in the lock screen 310 shown in FIG. 3D, if the prompt item 341 does not have the specific name and the specific password, one of following situations or a combination thereof is implemented, though the invention is not limited thereto: (1) when the prompt item 341 is enabled, the processing unit 110 directly displays the content of the note message; (2) the message provider cannot re-edit or modify the content of the note message; (3) when the prompt item 341 is enabled, the processing unit 110 does not display the content of the note message.

Moreover, regarding the determination in whether the prompt item 341 of the note message is enabled, it can be set as that the prompt item 341 is determined to be enabled when the prompt item 341 is selected. Moreover, a following determination procedure can be set, i.e. it is detected whether the prompt item 341 is dragged to a specific block 342 in the lock screen 310, and the prompt item 341 is determined to be enabled when detecting that the prompt item 341 is dragged to the specific block 342 in the lock screen 310.

Figure 4:
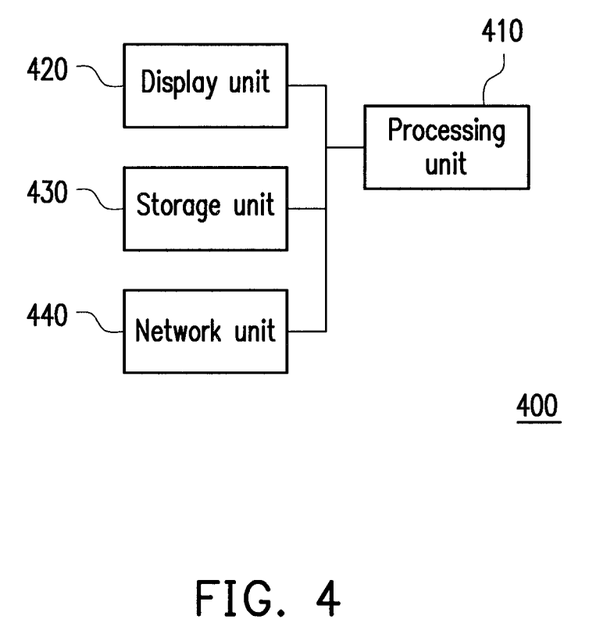
FIG. 4 is a block diagram of an electronic apparatus according to another embodiment of the invention.

FIG. 4 is a block diagram of an electronic apparatus according to another embodiment of the invention. Referring to FIG. 4, the electronic apparatus 400 includes a processing unit 410, a display unit 420, a storage unit 430 and a network unit 440. The processing unit 410 is coupled to the display unit 420, the storage unit 430 and the network unit 440. In the present embodiment, the processing unit 410, the display unit 420 and the storage unit 430 have same functions with that of the processing unit 110, the display unit 120 and the storage unit 130 of the aforementioned embodiment, which are not repeated. A difference between the present embodiment and the aforementioned embodiment is that the electronic apparatus 400 of the present embodiment further includes a network unit 440.

The network unit 440 is used to synchronize the note message to a remote device. For example, by using a method similar to that of Outlook letter synchronization, the processing unit 410 synchronizes the note message to the predetermined remote device through the network unit 440. After the note message is synchronized to the remote device through the network unit 440, when the processing unit 410 receives a remote control signal from the remote device through the network unit 440, the processing unit 410 activates a remote calling function under the screen lock mode.

For example, it is assumed that a user "Adam" of the electronic apparatus 400 also has a notebook computer, a smart phone and a tablet PC. The user "Adam" can determine in the electronic apparatus 400 whether to synchronize the note message to the notebook computer, the smart phone or the tablet PC after the note message is generated. It is assumed that the user "Adam" sets to synchronize the note message to the notebook computer and the smart phone, once the electronic apparatus 400 generates the note message, the electronic apparatus 400 synchronizes the note message to the notebook computer and the smart phone through the network unit 440. In this way, even if the user "Adam" is not in the seat, the user "Adam" can learn that a visitor visits through the notebook computer and the smart phone, and can learn the content of the message.

Moreover, when the user "Adam" receives the synchronized note message through the smart phone, the user can further transmit a remote control signal to the electronic apparatus 400 through the smart phone, and when the electronic apparatus 400 receives the remote control signal, the electronic device 400 activates a remote calling function or activates a video function through the processing unit 410 in case of the screen lock mode. In this way, the user "Adam" can communicate with the visitor by using the smart phone, or observe who the visitor is or whether the visitor has left by using the video function.

Further, the invention provides a computer program product, which is used for executing the aforementioned operation method. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the operation method and various functions of the electronic apparatus described above.

In summary, when a visitor visits as the user left, the visitor can use the electronic apparatus to leave a message. Moreover, a different visitor can set a specific account and a specific password for the left note message, such that not only the message provider can repeatedly edit the note message, but also the others are prevented from arbitrarily tampering the content of the note message. Moreover, the note message can also be synchronized to the remote device, such that the user can immediately learn that a visitor visits, so as to improve convenience of life.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An operation method for an electronic apparatus, wherein the electronic apparatus comprises a display unit and a processing unit, and the processing unit is coupled to the display unit, the operation method comprising:
    by the display unit, displaying a lock screen under a screen lock mode of the electronic apparatus, wherein the lock screen comprises a message option, wherein the message option is configured to trigger an operation of adding a note message under the screen lock mode;
    by the processing unit, detecting that the message option is enabled;
    by the display unit, displaying a message input nterface based on that the message option is enabled;
    generating the note message through the message input interface;
    displaying a prompt item corresponding to the note message on the lock screen through the display unit;
    displaying a password setting interface on the lock screen through the display unit and receiving a specific name corresponding to the note message and a specific password corresponding to the note message through the password setting interface;
    setting the specific name and the specific password for the note message through the password setting interface and closing the password setting interface;
    displaying a decoding interface on the lock screen through the display unit and receiving an input name and an input password through the decoding interface;
    displaying the message input interface for editing the note message on the lock screen through the display unit in response to that the input name and the input password are respectively complied with the specific name and the specific password; and
    receiving a screen unlock instruction and unlocking the screen lock mode according to the screen unlock instruction.

2. The operation method as claimed in claim 1, wherein the display unit is a touch display unit, the message input interface comprises a message block and an input block, and the step of generating the note message through the message input interface comprises:
    receiving a text input through the input block; and
    displaying corresponding content in the message block according to the text input, so as to generate the note message.

3. The operation method as claimed in claim 1, wherein the electronic apparatus further comprises an input unit, and the step of generating the note message through the message input interface comprises:
    receiving a text input through the input unit; and
    displaying corresponding content on the message input interface according to the text input, so as to generate the note message.

4. The operation method as claimed in claim 1, wherein the step of displaying the decoding interface on the lock screen comprises:
    displaying the decoding interface on the display unit when the prompt item of the note message is enabled.

5. The operation method as claimed in claim 4, further comprising:
    detecting whether the prompt item is dragged to a specific block in the lock screen; and
    displaying the decoding interface when detecting that the prompt item is dragged to the specific block in the lock screen.

6. The operation method as claimed in claim 1, further comprising:
    synchronizing, automatically, under the screen lock mode, a content of the note message to a remote device through a network unit once the note message is generated, wherein the remote device is set to be synchronized with the electronic apparatus;
    receiving a remote control signal from the remote device through the network unit; and
    activating a remote calling function under the screen lock mode according to the remote control signal, so that the electronic device is capable of communicating with the remote device.

7. The operation method as claimed in claim 1, further comprising:
    displaying the note message through the display unit after the screen lock mode is unlocked.

8. An electronic apparatus, comprising:
    a display unit, displaying a lock screen under a screen lock mode, and displaying a message option in the lock screen, wherein the message option is configured to trigger an operation of adding a note message under the screen lock mode; and
    a processing unit, coupled to the display unit, wherein the processing unit controls to display a message input interface based on that the processing unit detects that the message option is enabled on the display unit, so as to generate the note message through the message input interfaced, wherein the display unit further displays a prompt item corresponding to the note message on the lock screen, wherein the display unit further displays a password setting interface on the lock screen and receives a specific name corresponding to the note message and a specific password corresponding to the note message through the password setting interface, wherein the processing unit further sets the specific name and the specific password for the note message and closes the password setting interface, wherein the display unit further displays a decoding interface on the lock screen and receives an input name and an input password through the decoding interface, wherein the display unit further displays the message input interface for editing the note message on the lock screen in response to that the input name and the input password are respectively complied with the specific name and the specific password, wherein the processing unit further receives a screen unlock instruction and unlocks the screen lock mode according to the screen unlock instruction.

9. The electronic apparatus as claimed in claim 8, wherein the display unit is a touch display unit, the message input interface comprises a message block and an input block, the processing unit receives a text input through the input block, and displays corresponding content in the message block according to the text input, so as to generate the note message.

10. The electronic apparatus as claimed in claim 8, further comprising:

an input unit, coupled to the processing unit, and receiving a text input, wherein the processing unit displays corresponding content on the message input interface according to the text input, so as to generate the note message.

11. The electronic apparatus as claimed in claim 8, further comprising:

a network unit, coupled to the processing unit, and synchronizing the note message to a remote device, wherein the network unit further receives a remote control signal from the remote device, and activates a remote calling function under the screen lock mode.

12. The electronic apparatus as claimed in claim 8, wherein when the processing unit detects that the prompt item of the note message is enabled, the display unit displays the decoding interface.

13. The electronic apparatus as claimed in claim 8, wherein the display unit further displays the note message after the screen lock mode is unlocked.

* * * * *